(12) United States Patent
Pimpinella et al.

(10) Patent No.: US 10,215,934 B2
(45) Date of Patent: Feb. 26, 2019

(54) HYBRID OPTICAL FIBER AND COPPER CONDUCTOR CABLE ASSEMBLY

(71) Applicant: Panduit Corp., Tinley Park, IL (US)

(72) Inventors: Richard J. Pimpinella, Frankfort, IL (US); Daniel E. Host, Oak Lawn, IL (US); Jose M. Castro, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/910,119

(22) Filed: Mar. 2, 2018

(65) Prior Publication Data

US 2018/0252875 A1 Sep. 6, 2018

Related U.S. Application Data

(60) Provisional application No. 62/466,497, filed on Mar. 3, 2017.

(51) Int. Cl.
*G02B 6/38* (2006.01)
*G02B 6/44* (2006.01)

(52) U.S. Cl.
CPC ......... *G02B 6/3894* (2013.01); *G02B 6/3821* (2013.01); *G02B 6/3857* (2013.01); *G02B 6/4416* (2013.01)

(58) Field of Classification Search
CPC .. G02B 6/3894; G02B 6/3821; G02B 6/3857; G02B 6/4416
USPC .............................................. 385/53–94, 101
See application file for complete search history.

(56) References Cited

U.S. PATENT DOCUMENTS

| | | | |
|---|---|---|---|
| 4,632,505 A * | 12/1986 | Allsworth | G02B 6/32 385/61 |
| 4,720,630 A | 1/1988 | Takeuchi et al. | |
| 5,005,939 A | 4/1991 | Arvanitakis | |
| 5,242,315 A | 9/1993 | O'Dea | |
| 5,448,676 A | 9/1995 | White et al. | |
| 6,572,277 B1 * | 6/2003 | Ritter | G02B 6/4471 385/77 |
| 6,588,938 B1 * | 7/2003 | Lampert | G02B 6/3817 385/58 |
| 2006/0093277 A1 * | 5/2006 | Mulligan | G02B 6/3817 385/75 |
| 2011/0188810 A1 | 8/2011 | Ciechomski et al. | |
| 2011/0200284 A1 * | 8/2011 | Zhovnirovsky | G02B 6/32 385/33 |

(Continued)

*Primary Examiner* — Thomas A Hollweg
*Assistant Examiner* — Guy Anderson
(74) *Attorney, Agent, or Firm* — Christopher S. Clancy; James H. Williams; Christopher K. Marlow (57) ABSTRACT

A connector assembly has a male portion and a female portion. The male portion has a pair of electrical contacts and ends of a pair of plastic optical fibers attached. The female portion has a set of through-holes configured to accept the electrical contacts of the male portion and the ends of the plastic optical fibers attached to the male portion such that the plastic optical fibers of the male portion abut plastic optical fibers secured to the female portion within the through-holes of the female portion. In one embodiment, the male portion has a cylindrical shroud configured to accept a cylindrical protrusion on the female portion. The female portion also has a nut rotatably attached with internal threads configured to engage external threads located on the cylindrical shroud of the male portion.

2 Claims, 11 Drawing Sheets

(56) References Cited

U.S. PATENT DOCUMENTS

2011/0280528 A1 11/2011 Wu
2015/0030290 A1* 1/2015 Wood .................. G02B 6/3887
  385/76

* cited by examiner

HYBRID OPTICAL FIBER AND COPPER CONDUCTOR CABLE ASSEMBLY

CROSS REFERENCE TO RELATED APPLICATION

This application claims priority to U.S. Provisional Application No. 62/466,497, filed Mar. 3, 2017, the subject matter of which is hereby incorporated by reference in its entirety.

FIELD OF INVENTION

This invention related generally to hybrid fiber/copper connectors and more specifically to a hybrid fiber/copper connector utilizing plastic optical fibers.

BACKGROUND

Network communications and control systems for industrial automation (IA) applications historically utilize proprietary protocols transmitted at low data rates over twisted copper pairs. The primary benefits of copper cabling are low cost, ease of termination, and the ability to provide electrical power to remote network devices over the same twisted pair. However, in harsh or hazardous environments where electrical sparks can cause fire, or machines generate high levels of electro-magnetic interference (EMI), or where chemical corrosive of copper wires can occur, etc., optical fibers are often required.

Single-mode and multimode glass optical fibers are high bandwidth and reliable transmission media in wide use from short reach data center server communications to oceanic transcontinental telecommunications. Although optical fiber communication provides significant performance advantages compared to copper media, glass optical fiber and laser transceivers are considerably more expensive and are not easily field terminated compared to their electrical counterparts.

In this disclosure, we describe a hybrid optical and electrical cable assembly utilizing an alternative low-cost Plastic Optical Fiber (POF) media that can support data rates up to 1 Gb/s. The invention provides the benefits of low cost, simple field termination, with the reliable of optical communications with EMI immunity and with the addition of metallic conductors for remote electrical powering.

Plastic Optical Fiber (POF) is a low cost step index core waveguide media made of poly(methyl methacrylate) (PMMA), more commonly known as Plexiglass, Lucite, or Acrylic. Optical transceivers utilize low cost light emitting diodes (LEDs) and silicon photodetectors. Although POF was first developed in the early 1970's, it's in limited use due to its high attenuation and modal dispersion, limiting communications to low data rates over short distances. However, with recent advances in signal processing and advanced modulation schemes such as pulse amplitude modulation (PAM), POF is now capable of supporting 1 Gb/s over a distance of at least 50 m, and 100 Mb/s (Fast Ethernet) up to at least 150 m.

The primary benefit of POF, as well as its primary drawback for optical communications is its large core, 0.96 mm in diameter. The core is surrounded by a thin fluorinated polymer outer cladding layer, giving the fiber an overall diameter of 1 mm. Due to the large core of POF (in comparison to 9-microns for single-mode and 50-microns for multimode glass optical fiber, POF supports thousands of fiber modes and consequently, has high modal dispersion and low signal bandwidth. However, the large core also relaxes alignment tolerances required for mechanical termination and alignment to transceiver components. Unlike glass fiber termination, POF does not require split sleeves or any other precision component for fiber-to-fiber core alignment and does not requiring end face polishing. Therefore, although POF has limited bandwidth, the termination cost is extremely low, typically less than copper for data rates of 100 Mb/s and 1 Gb/s.

For typical industrial applications, the cabling and terminations require ingress protection against the intrusion of solid objects and/or water. The degree of protection is classified by the International Protection (IP) ratings (also referred to as Ingress Protection ratings) and is specified in the international standard IEC 60529. The IP code consists of the letters IP followed by two digits and an optional letter, where the first digit specifies the degree of protection against solid foreign objects, and the second against water.

Figure 1:
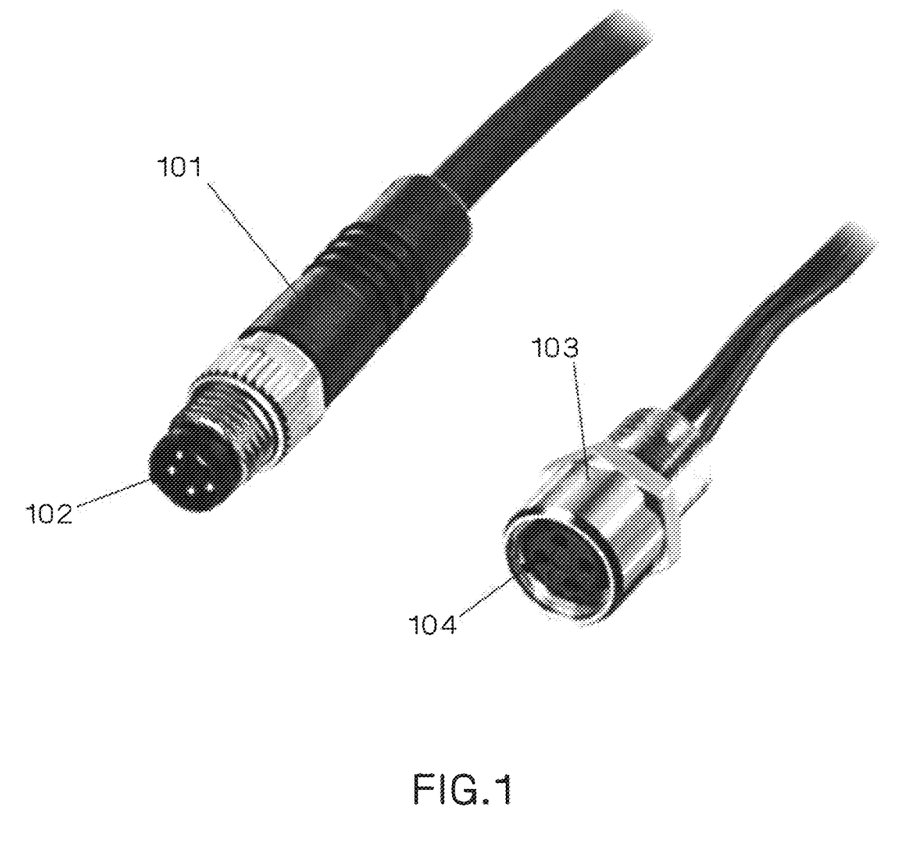
FIG. 1 shows an M8 style IP67 connector.

The most common styles of electrical and optical cable terminations used for factory automation, process control, industrial instrumentation, and commercial electronics are the M12 and M8 connectors, which are circular threaded screw-lock connectors as shown in FIG. 1. For optical fiber terminations the M8 or M12 inner housings, which typically contain the electrical contacts are replaced with standardized optical connectors and adapters specified in the Fiber Optical Connector Intermateability Standard (FOCIS), most commonly the LC push pull type connector shown in FIG. 2.

In this invention, the optical fibers and electrical pins are interchangeable within the same connector. In one embodiment of the present invention, two electrical contact pins in a 4-pin M8 style connector are removed and replaced with two POF fibers, eliminating the need for costly FOCIS compliant connectors and adapters. The elimination of optical connectors and adapters is possible because of the low alignment tolerance required for POF interconnections, and the fact that the POF has the same 1mm outside diameter as the typical electrical pin contacts. By replacing all but two of electrical contacts, the connector can be adapted to accept a duplex pair of POF, while the remaining two electrical contacts provide power and ground for remote powering. To secure the POF fibers and provide adequate end face physical contact, some modifications to the M8 (or M12) connector assemblies are required as exemplified in the following sections. The larger M12 connector enables additional POF pairs and/or electrical contacts to be installed.

SUMMARY

A connector assembly has a male portion and a female portion. The male portion has a pair of electrical contacts and ends of a pair of plastic optical fibers attached. The female portion has a set of through-holes configured to accept the electrical contacts of the male portion and the ends of the plastic optical fibers attached to the male portion such that the plastic optical fibers of the male portion abut plastic optical fibers secured to the female portion within the through-holes of the female portion. In one embodiment, the male portion has a cylindrical shroud configured to accept a cylindrical protrusion on the female portion. The female portion also has a nut rotatably attached with internal threads configured to engage external threads located on the cylindrical shroud of the male portion.

DETAILED DESCRIPTION

In harsh industrial environments, it is advantageous to deploy optical fiber rather than traditional twisted pair copper wiring. Fiber optic cabling outperforms copper connectivity under most adverse conditions including shock and vibration, crushing and pulling, bending or twisting, exposure to dust, dirt, water, oils, chemicals, corrosive gasses, temperature extremes, metallic shavings and filings, humidity, electrostatic discharge, solar radiation, radiated RF, electromagnetic interference, and electrical transients. However, silica glass optical fibers required high precession terminations not easily achieved in the field and are considerably more expensive than copper connectivity and transceivers.

For industrial applications, it is advantageous to utilized POF for factory automation and control systems. The primary advantage of POF is its large 1 mm core diameter which makes field terminations simple and low cost, and easier to perform than RJ-45 style connectors. The ease of termination is realized because of its large core diameter, which is insensitive to lateral offsets and misalignments, and no end face polishing is required.

POF is a standardized fiber type defined in IEC 60793-2-40, where a 1 mm core diameter fiber is specified as type A4a.2. Recently the IEEE developed a standard for industrial applications transmitting 1 Gb/s Ethernet over a distance of 50 m for this fiber type. Transceivers compliant to this standard (IEEE 802.3bv) can support Fast Ethernet (100 Mb/s) up to distances of 150 m.

IEEE 802.3 Gigabit Ethernet and Fast Ethernet Standards for POF provide an open standardized data communication network for industrial automations and control systems. Industrial applications often require devices to be remotely powered. For copper connectivity, the IEEE specifies power over Ethernet (PoE), however optical transceivers do not support PoE, and therefore, optical cabling does not typically provide this feature.

FIG. 1 shows an M8 style IP67 connector with four electrical contacts 102 in the male plug connector assembly 101, and female electrical contact receptacles 104 in adapter assembly 103.

Figure 2:
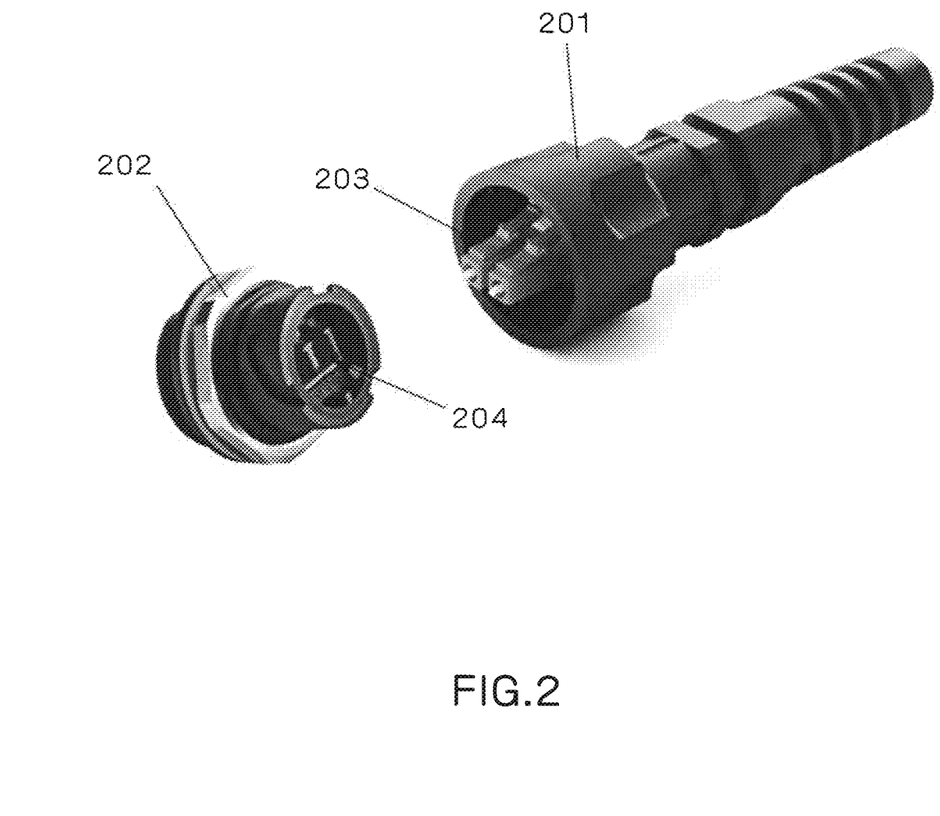
FIG. 2 shows am M12 style IP67 connector.

FIG. 2 shows an M12 style IP67 connector with a FOCIS compliant duplex LC connector 203 in M12 assembly 201, and duplex LC adapter 204 in M12 mating assembly 202.

In this invention, we incorporate POF for data and control communications and copper conductors for supplying power and ground. In one embodiment, we utilized the M8 industrial connector (8 mm), a smaller version of the M12 (12 mm) connector. Optical and electrical functionality is not typically provided in M8 and M12 style connectors. The large and high precision FOCIS compliant glass optical fiber connectors and adapters are not easily integrated with RJ-45 copper terminations in the same connector housing. However, in this invention both the FOCIS compliant and RJ-45 form factors are eliminated and PoE can be easily implemented.

Figure 3:
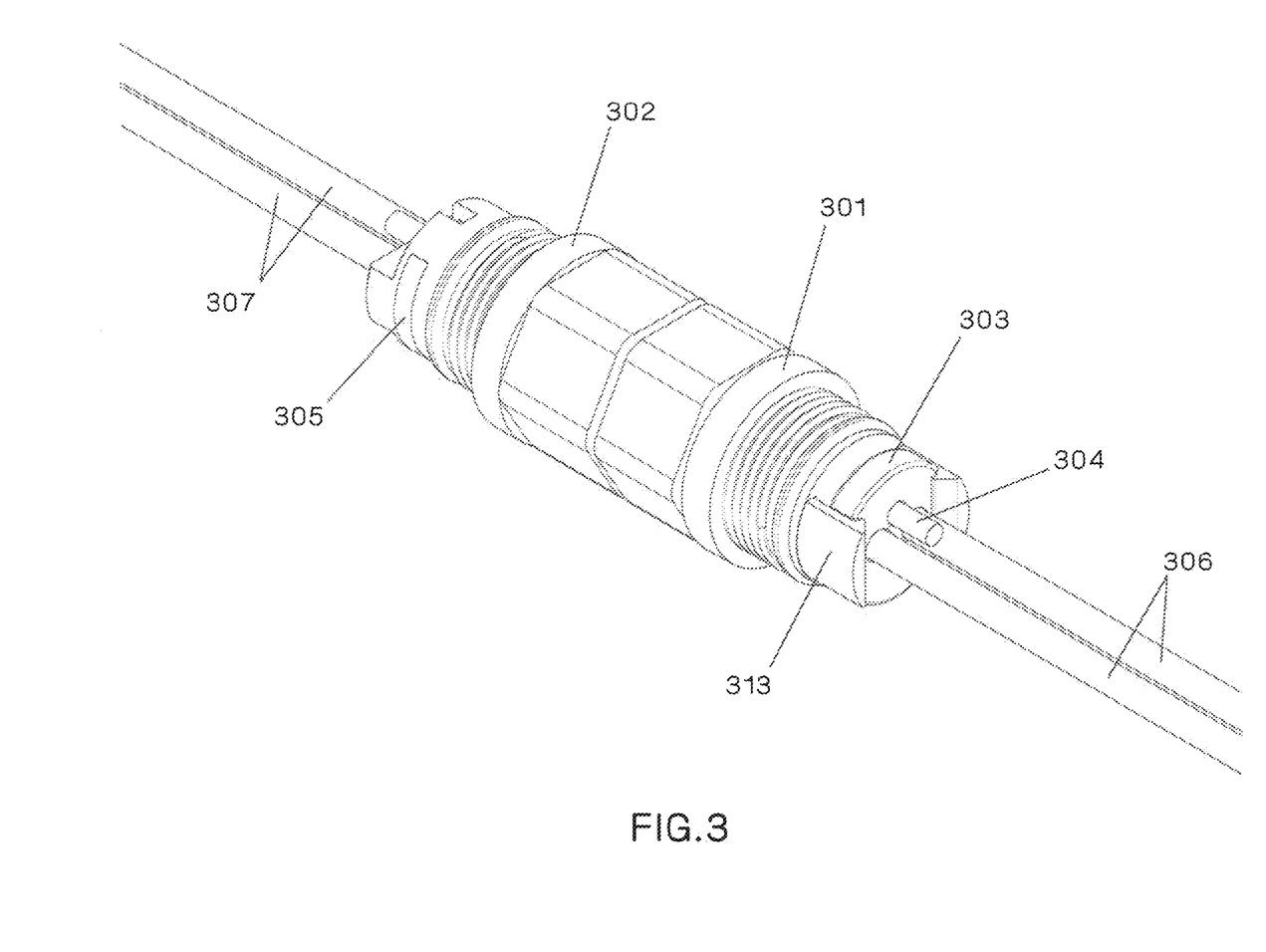
FIG. 3 shows an isometric view of one embodiment of an M8 style IP67 connector according to the present invention.
Figure 4:
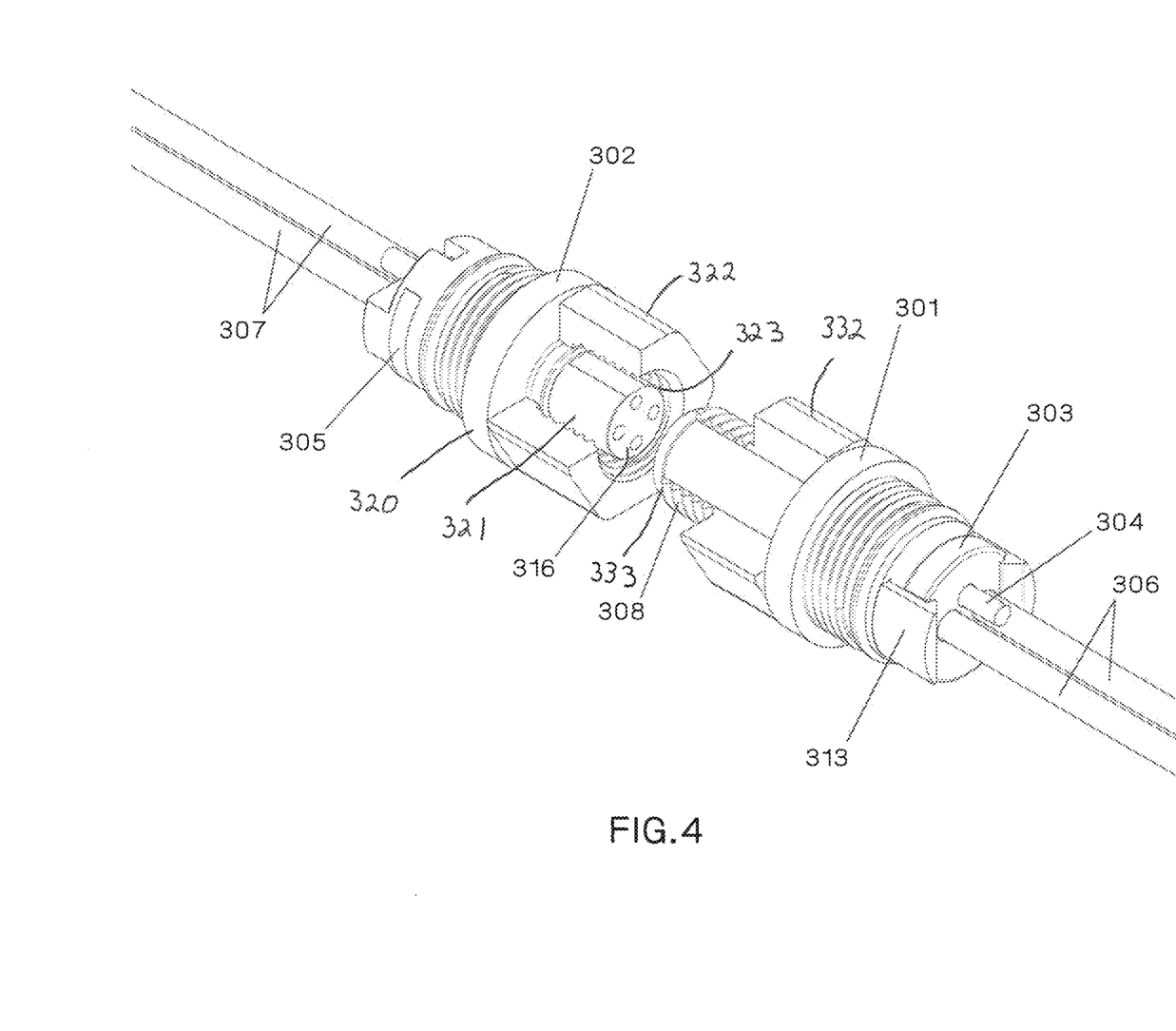
FIG. 4 shows a cut-away isometric view of the connector of FIG. 3.

FIGS. 3 and 4 show an M8 style IP67 connector assembly 301, 302 according to the present invention, having a male portion 301, female portion 302, two mating duplex pairs of plastic optical fibers 306 and 307, and two pairs of mating electrical contacts 304 for power and ground (only 1 single contact shown).

Figure 5:
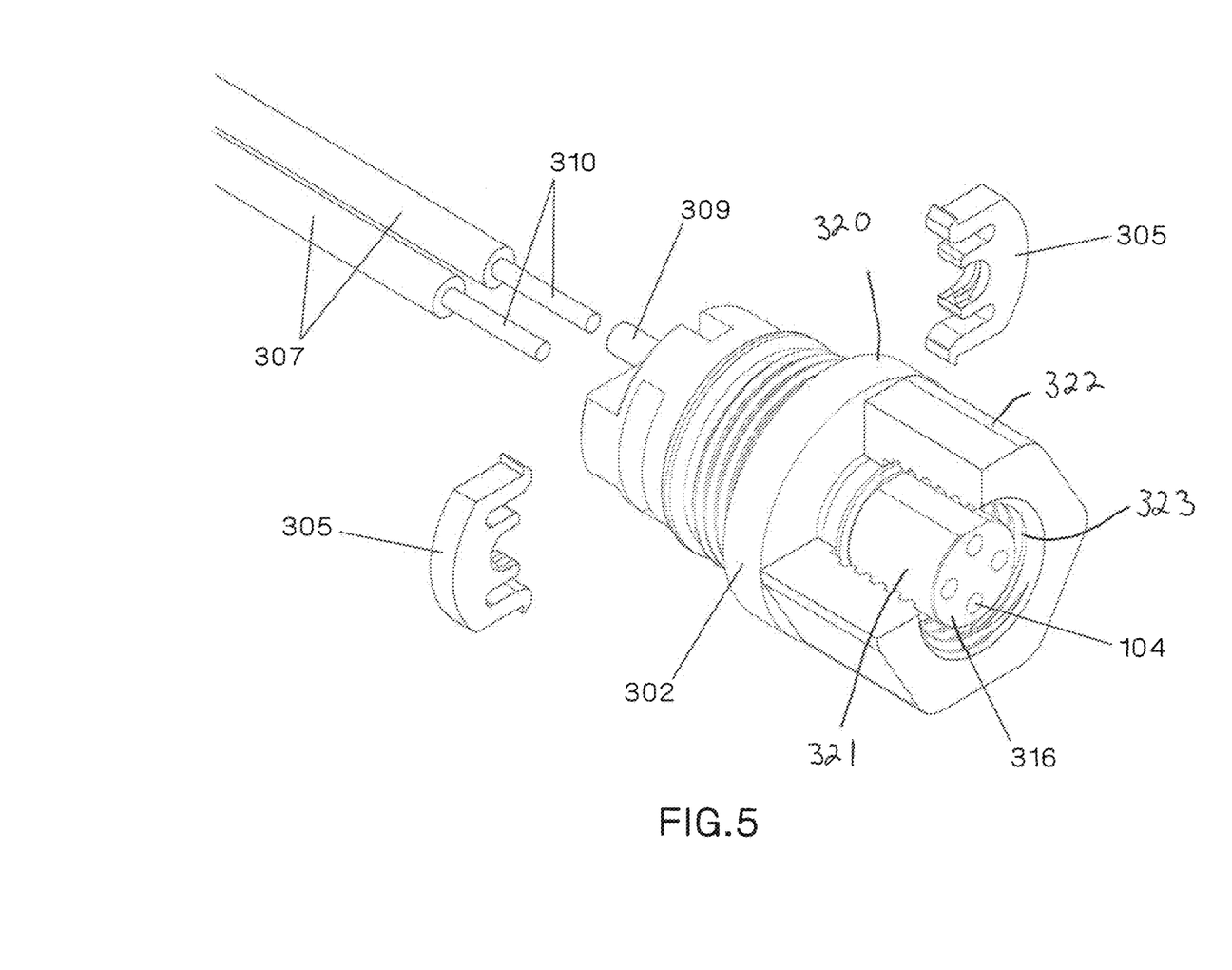
FIG. 5 shows an isometric and cut-away view of the female portion of the connector of FIG. 3.

FIG. 5 shows an exploded, cut-away isometric view of the female portion 302 of the connector assembly. The female portion 302 can include a female housing 320 which can have a cylindrical protrusion 321 with an endface 316. A nut 322 with internal threads 323 surrounds the cylindrical protrusion 321 and is rotatably secured to the female housing 320. The female portion can also include a duplex fiber pair 307, fiber locking clamps 305, and two female receptacle electrical contacts 309 (only 1 shown). The female portion 302 has through-holes 104 extending from a rear of the housing, through the cylindrical protrusion 321 to the endface 316.

Figure 6A:
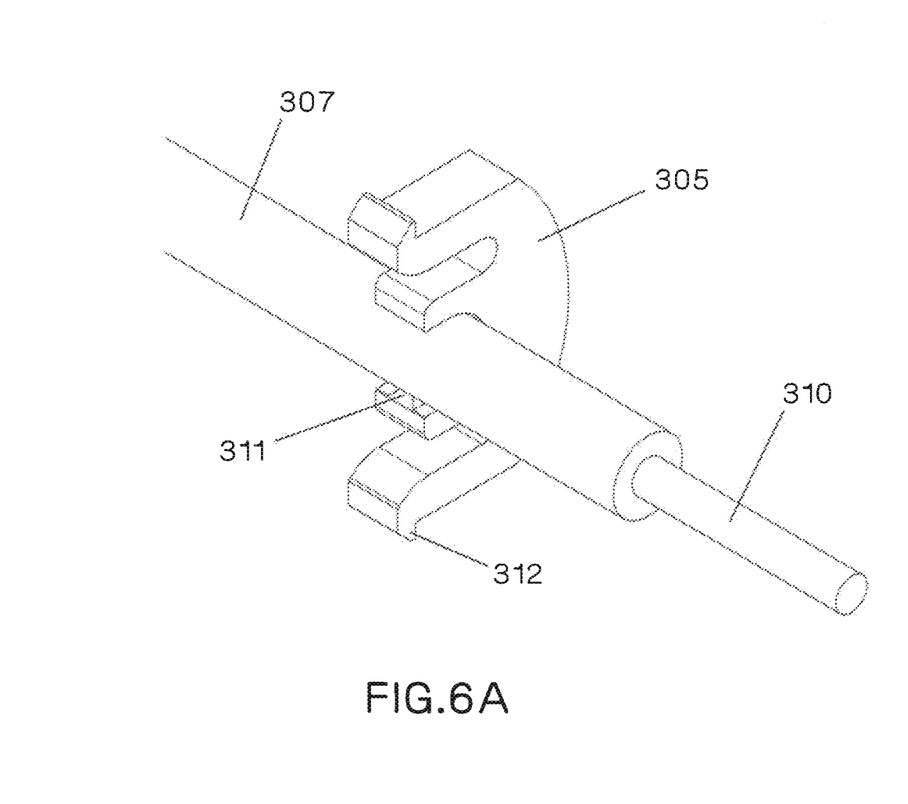
FIGS. 6A and 6B shows the locking clamps of the connector of FIG. 3.
Figure 6B:
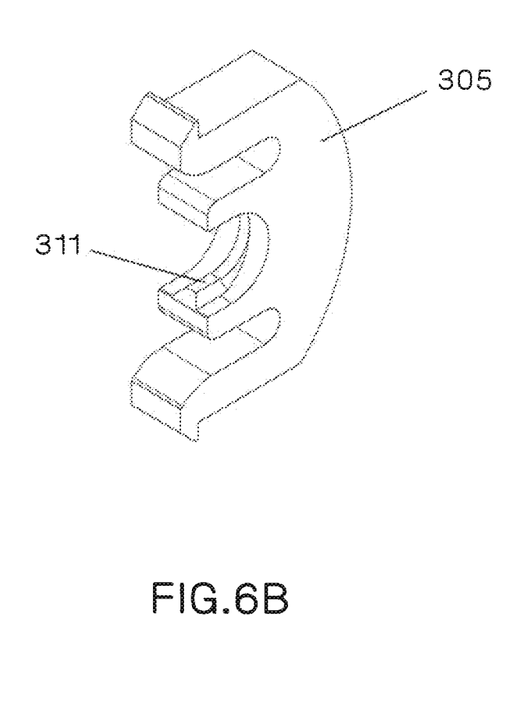

FIGS. 6A and 6B show an optical fiber 307 with a locking clip 305 attached for securing the stripped fiber end 310 into the female portion 302. A first feature 311 depresses the outer jacket of the fiber 307, and a second feature 312 locks the clip 305 to the female portion 302.

Figure 7:
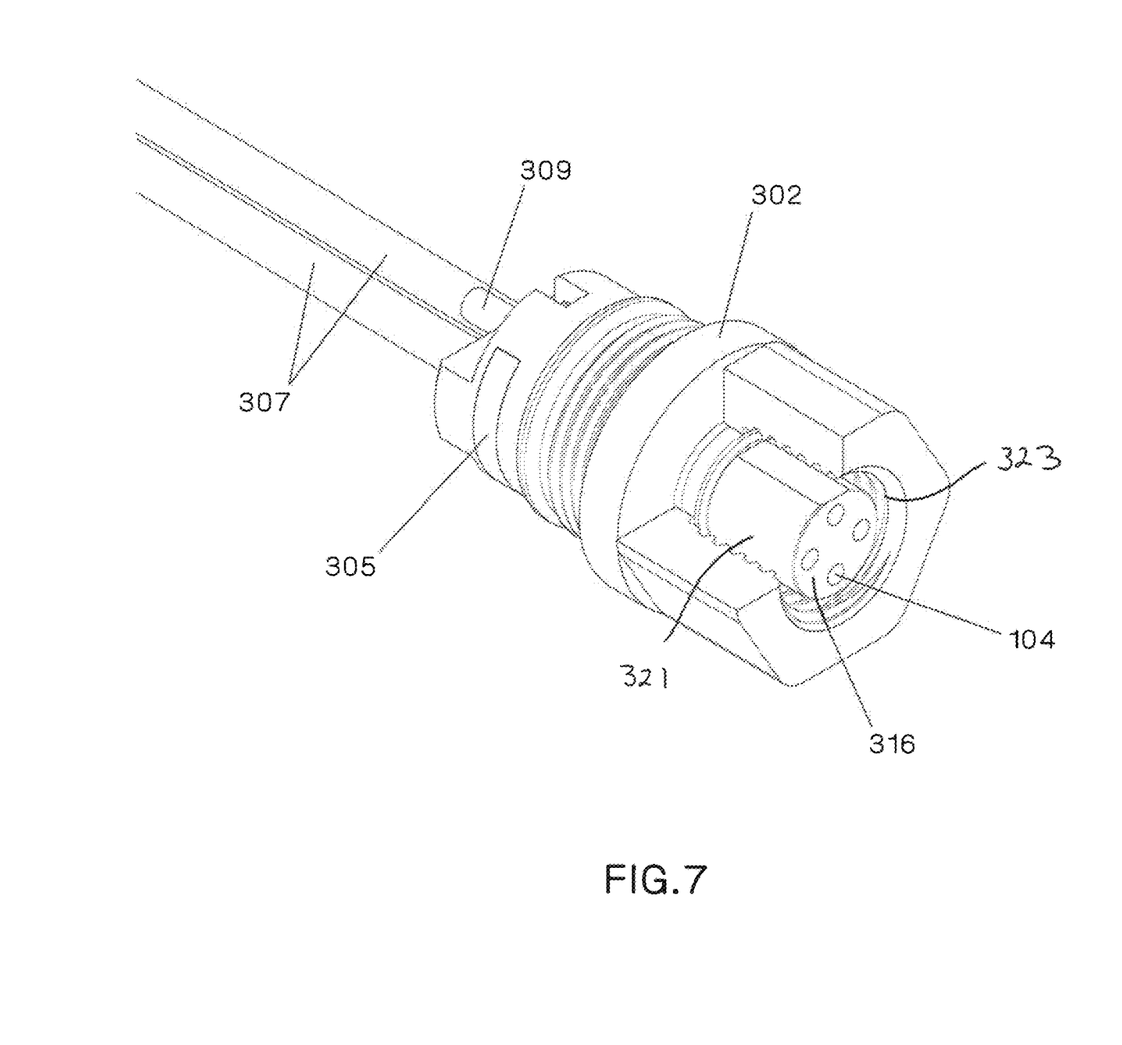
FIG. 7 is a cut-away isometric view of the female portion of the connector of FIG. 3.

FIG. 7 shows the assembled female portion 302, with inserted the duplex fiber pair 307, locking clamps 305 fully engaged, and electrical contacts 309 inserted (only 1 shown). The bare fiber end 310 (not shown) is positioned such that the end face is located approximately half way into the through hole typically used for female electrical contacts 104. The through holes 104 serve as an alignment sleeve for mating the stripped end 310 of POF 307, to the stripped end of the bare fiber end face of fiber 306.

Figure 8:
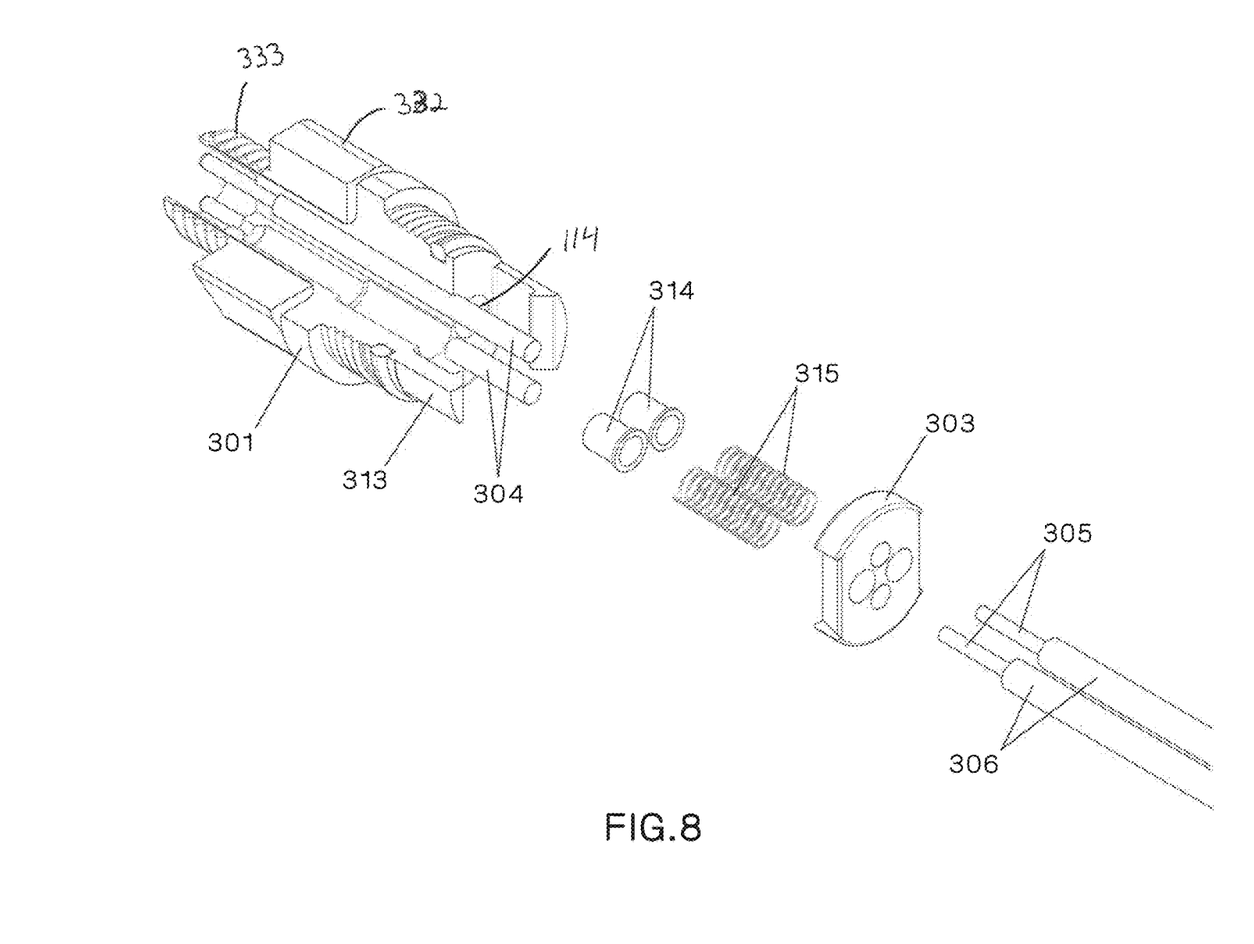
FIGS. 8 and 9 are a cut-away isometric view of the male portion of the connector of FIG. 3.

FIG. 8 shows an exploded, cut-away isometric view of the basic elements of the male portion 301. The male portion 301 includes a male housing 332 with a cylindrical extension shroud 333, duplex pair of plastic optical fibers 306, a pair of crimp sleeves 314, coil springs 315, and endplate 303. The male portion 301 also includes a pair of male electrical pins 304 for power and ground connections. The cylindrical shroud 333 of the male portion 301 has external threads 308 for engaging the internal threads 323 of the nut 322 of the female portion 302. In addition, the cylindrical protrusion 321 of the female portion 302 is configured to be inserted into the cylindrical shroud 333 of the male portion 301. The male housing 332 has through-holes 1114 which extend from the rear of the male housing to the rear of the cylindrical shroud of the male housing.

Figure 9:
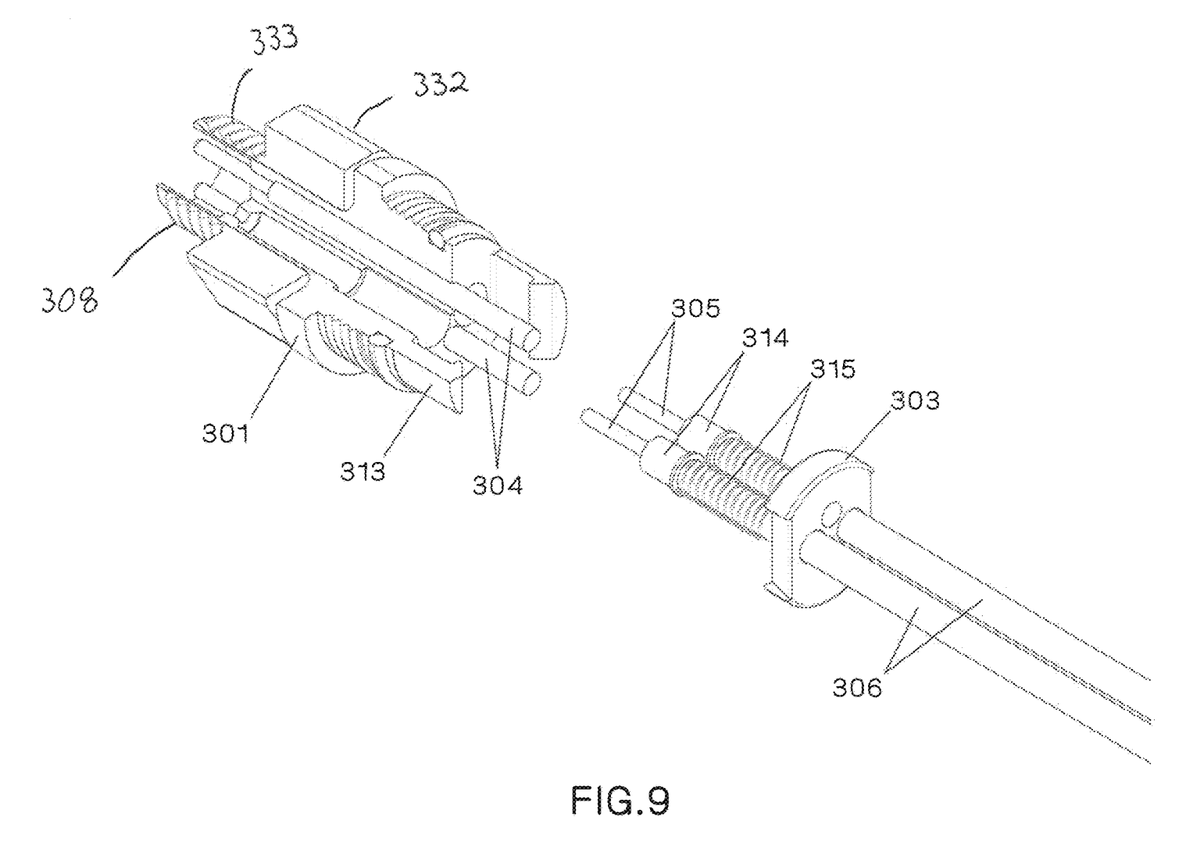

As shown in FIG. 9 crimp sleeves 314 are attached to the jacket of the fibers 306 and then with the use of coil springs 315 and endplate 303, the fibers 306 are secured to the male housing 301 in a manner to allow a degree of axial movement. Stripped fiber ends 305 are prepared for mating.

Figure 10:
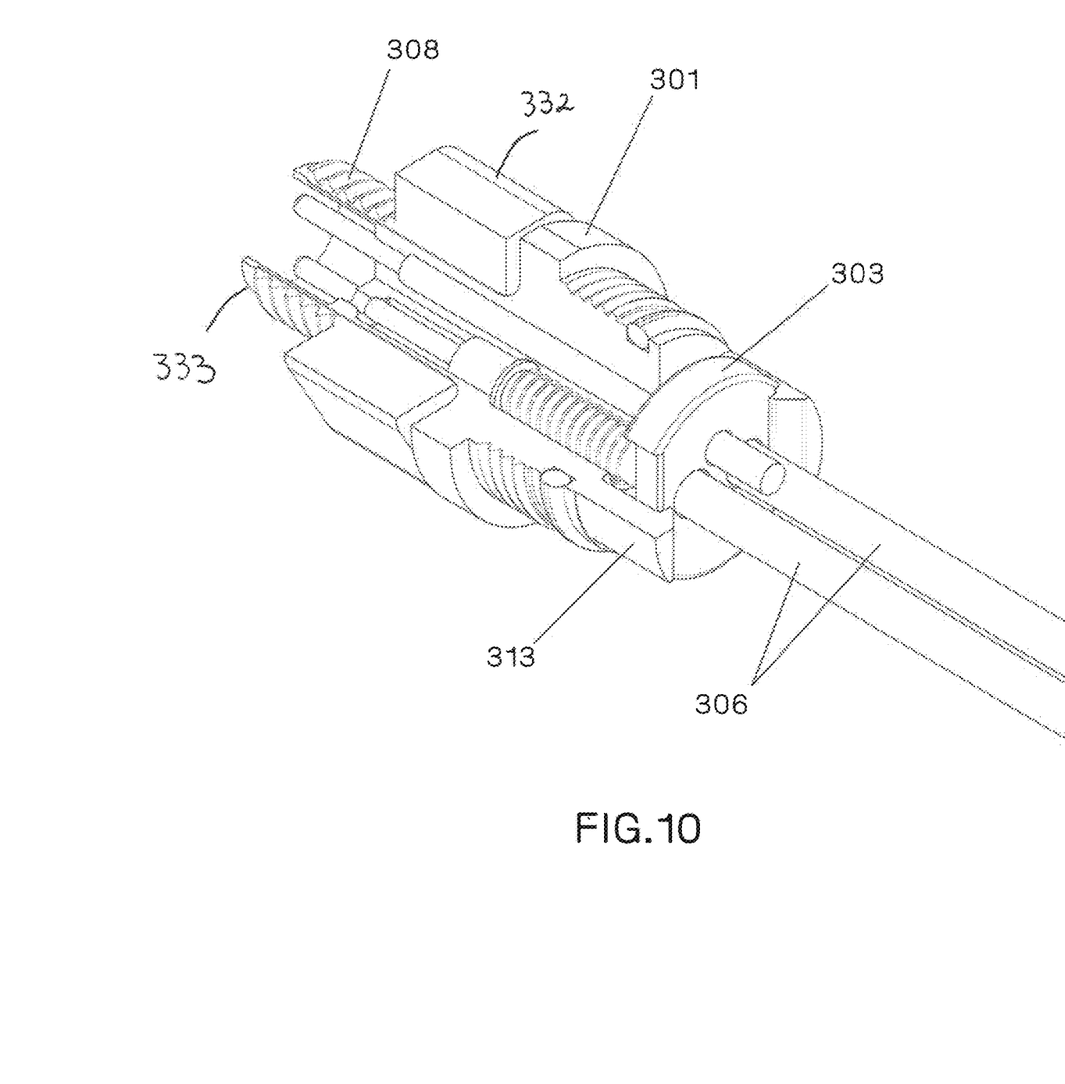
FIG. 10 shows a cut-away isometric view of the male portion of the connector of FIG. 3.

FIG. 10 shows the assembled male portion 301 comprising a pair of plastic optical fibers 306, electrical contact pins 304 for supplying power and ground, and endplate 303 locked in place by latches 313 of M8 housing assembly 301.

Figure 11:
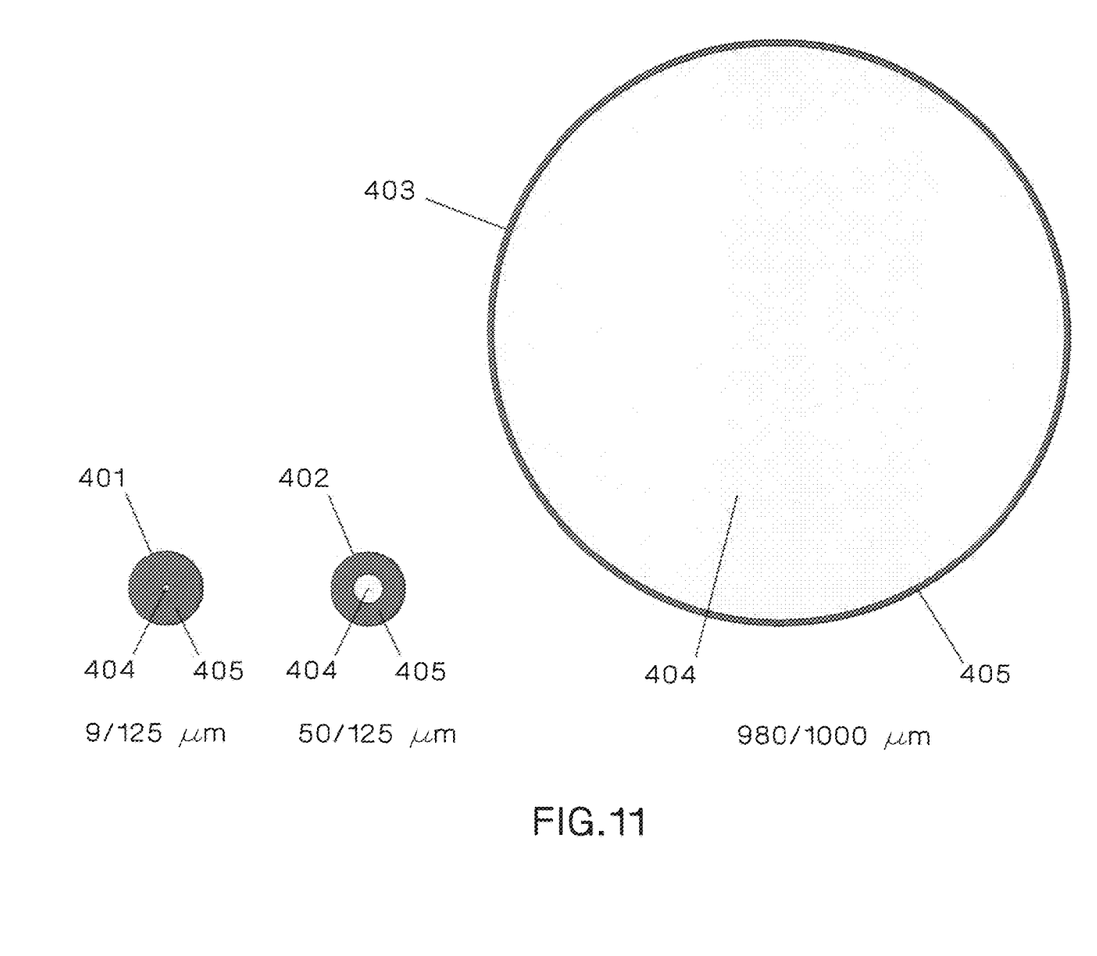
FIG. 11 shows a comparison of relative cross-sectional areas of single-mode and multimode glass optical fibers, and a 1 mm diameter plastic optical fiber.

FIG. 11 shows a comparison of relative cross-sectional areas of single-mode 401 and multimode 402 glass optical fibers, and a 1mm diameter plastic optical fiber 403 as used in the present invention. The darker shaded area depicts the claddings, and the lighter shaded area depicts the fiber cores where the optical signal propagates.

In one embodiment of the present invention the female connector assembly 302, includes two lmm diameter plastic optical fibers 307 and two copper conductors 309 for supplying power and ground to a device. The stripped ends 310 of fibers 307 are cut to length such that the end faces are positioned approximated half way into a bored hole 104, which serves as a mating sleeve for the second duplex pair of fibers 306. In this embodiment, the fibers remain stationary when mated.

Referring to FIG. 8, the male connector assembly 301 includes features 313 for locking the duplex fiber subassembly comprising crimp sleeves 314, coil springs 315, the endplate 303, and duplex fibers 306 in place. When mated, the stripped duplex fiber sections 305 are positioned in alignment sleeves 104 of female portion 302, such that the end faces of fiber sections 305 are in physical contact with the end faces of stripped fiber sections 310 located in female portion 302. The coil springs 315 are designed to provide the required force for maintaining physical contact between fiber end faces.

Since electrical conductors do not carry data, the wire gauge and cable design are not critical. therefore, the wire gauge can be selected for large current carrying capacities.

It is understood that someone skilled in the art can integrate the optical and electrical functionality as described in this invention into other form factors other than M8 and M12 style connectors.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A connector assembly comprising a male portion, the male portion having a housing, ends a pair of plastic optical fibers attached thereto and a pair of electrical contacts, and a female portion, the female portion having a female housing with two pairs of through-holes wherein the first pair of through-holes are configured to accept the electrical contacts of the male portion and the second pair of through holes are configured to accept the ends of the plastic optical fibers of the male portion such that they abut plastic optical fibers secured to the female portion within the through-holes of the female portion, wherein the plastic optical fibers of the male portion are secured to the male housing via crimp sleeves attached to a jacket of the plastic optical fiber, and endplate secured to the housing and compression springs secured to the crimp sleeves and located between the crimp sleeves and the endplate.

2. The connector of claim 1 wherein the female portion further comprises a cylindrical protrusion and a nut surrounding the cylindrical protrusion and rotatably secured to the female housing, the male portion includes a cylindrical shroud configured to accept the cylindrical protrusion of the female housing and further wherein the male portion has external threads on the cylindrical shroud configured to engage the internal threads of the nut.

* * * * *